(12) United States Patent
Zhang

(10) Patent No.: US 8,283,065 B2
(45) Date of Patent: Oct. 9, 2012

(54) PORTABLE ELECTRONIC DEVICE WITH DETACHABLE BATTERY COVER HAVING ELASTIC POSITIONING ELEMENT

(75) Inventor: Yu Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 293 days.

(21) Appl. No.: 12/768,812

(22) Filed: Apr. 28, 2010

(65) Prior Publication Data

US 2011/0039141 A1   Feb. 17, 2011

(30) Foreign Application Priority Data

Aug. 11, 2009 (CN) .......................... 2009 1 0305506

(51) Int. Cl.
*H01M 2/10* (2006.01)

(52) U.S. Cl. .............. 429/97; 429/96; 429/100; 292/19; 292/80; 292/300; 292/302; 292/303

(58) Field of Classification Search ............. 429/96, 429/97, 100; 292/19, 80, 81, 87–89, 91, 292/300, 302, 303
See application file for complete search history.

(56) References Cited

U.S. PATENT DOCUMENTS

| | | | |
|---|---|---|---|
| 2007/0026299 A1* | 2/2007 | Park et al. | 429/97 |
| 2007/0031727 A1* | 2/2007 | Hsu | 429/97 |
| 2008/0042448 A1* | 2/2008 | Ge et al. | 292/137 |

* cited by examiner

*Primary Examiner* — Barbara Gilliam
*Assistant Examiner* — Zachary Best
(74) *Attorney, Agent, or Firm* — Altis Law Group, Inc.

(57) ABSTRACT

A portable electronic device includes a housing, a battery cover, and a latching module. The battery cover has at least one protrusion. The latching module includes an elastic positioning element attached to the housing and a resisting element attached to the elastic positioning element. The at least one protrusion of the battery cover impels the resisting element to deform the elastic positioning element during assembly and disassembly.

13 Claims, 5 Drawing Sheets

PORTABLE ELECTRONIC DEVICE WITH DETACHABLE BATTERY COVER HAVING ELASTIC POSITIONING ELEMENT

BACKGROUND

1. Technical Field

The exemplary disclosure generally relates to portable electronic devices and, particularly, to a portable electronic device having a detachable battery cover.

2. Description of Related Art

Batteries are widely used in portable electronic devices, such as personal digital assistants (PDAs), mobile phones, and so on. Conventionally, batteries are received in the electronic devices, and battery covers provided to connect to housings of the electronic devices to secure the batteries. Batteries are replaced by opening the battery covers when, for example, the batteries are damaged and/or dead (i.e. no longer rechargeable).

Although battery cover assemblies may be simple, the engagement between the battery cover and the housing of the mobile phone can be too strong to allow easy detachment thereof.

Therefore, there is room for improvement within the art.

BRIEF DESCRIPTION OF THE DRAWINGS

Many aspects of the exemplary portable electronic device can be better understood with reference to the following drawings. The components in the drawings are not necessarily drawn to scale, the emphasis instead being placed upon clearly illustrating the principles of the portable electronic device. Moreover, in the drawings, like reference numerals designate corresponding parts throughout the several views, in which.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
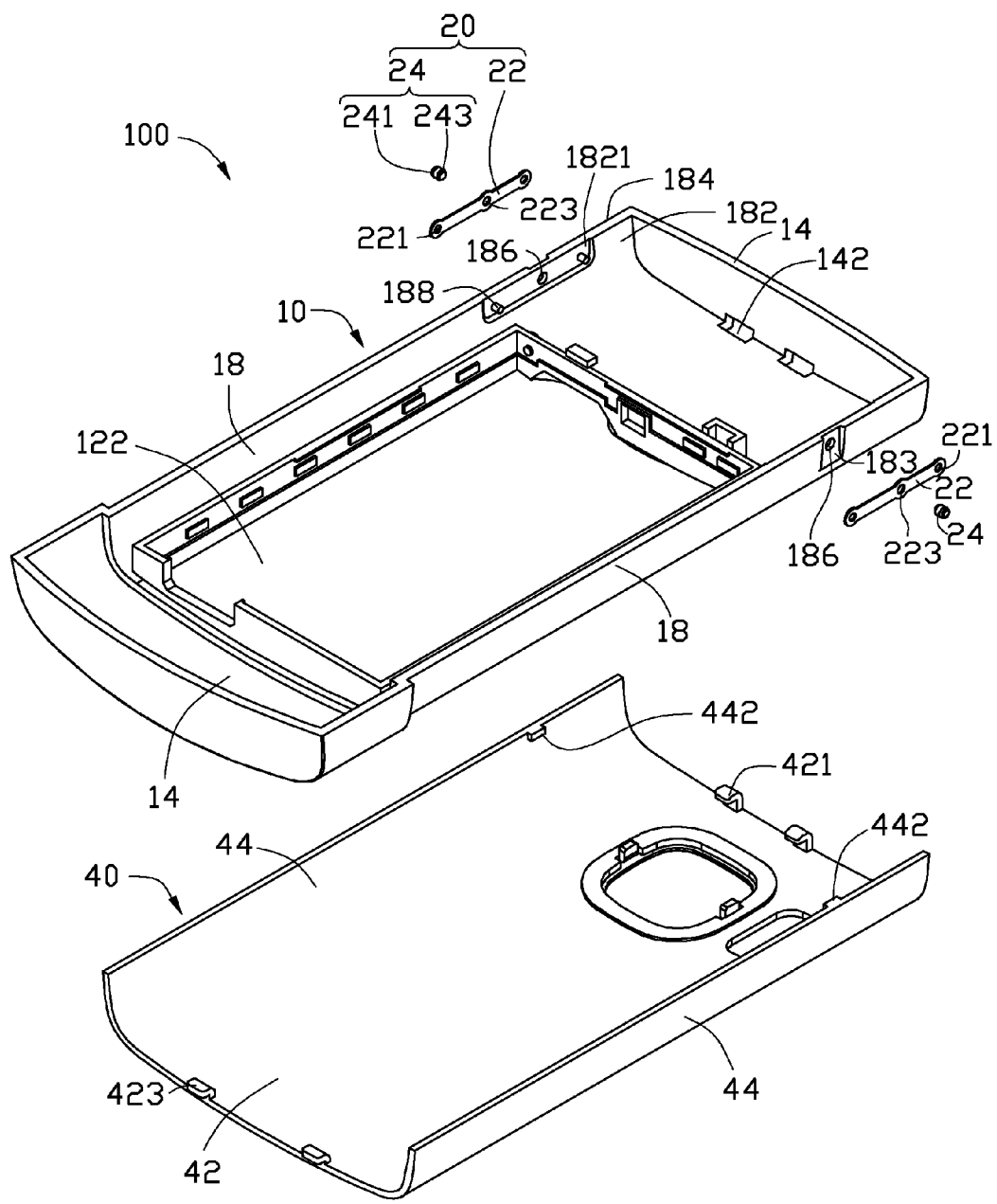
FIG. 1 is an exploded, isometric view of a first embodiment of a portable electronic device as disclosed.

FIG. 1 is an exploded, isometric view of an exemplary embodiment of a portable electronic device 100 as disclosed, such as a cellular phone or other electronic device where battery power is employed. The portable electronic device 100 includes a housing 10, two latching modules 20, and a battery cover 40. The battery cover 40 is attached to the housing 10 by the latching modules 20.

The housing 10 includes two end portions 14 and two sidewalls 18. Each of the end portions 14 defines two apertures 142. Each of the sidewalls 18 includes a first surface 182 and a second surface 184 opposite to the first surface 182. The first surface 182 defines a slot 1821 configured for receiving a corresponding latching module 20. A bottom surface of the slot 1821 defines a through hole 186 in a middle area thereof. Two posts 188 project from the bottom surface of two sides of the through hole 186. The second surface 184 of each sidewall 18 defines a groove 183 communicating with a corresponding through hole 186. The bottom of the groove 183 is inclined so that the battery cover 40 is more easily slid into position to attach to the housing 10.

Each of the latching modules 20 includes an elastic positioning element 22 and a latching element 24. The positioning element 22 defines two latching holes 221 at two ends thereof and a positioning hole 223 at a middle thereof. Each of the posts 188 can be received in a corresponding latching hole 221. Each of the latching elements 24 is substantially cylindrical, and includes a resisting portion 241 and a positioning portion 243. In the first embodiment, the diameter of the resisting portion 241 is larger than that of the positioning portion 243. A diameter of the resisting portion 243 is substantially equal to that of the positioning hole 223.

The battery cover 40 includes a base plate 42 and two side plates 44 projecting substantially perpendicular to the base plate 42. Two L-shaped tabs 421 project from one end of the base plate 42, and two hooks 423 project from the other end of the base plate 42. The first and second tabs 421 and 423 are respectively received in a corresponding aperture 142. A protrusion 442 extends from each of the side plates 44 substantially parallel to the base plate 42. Each protrusion 442 is formed to be received in a corresponding groove 183 and press against a positioning portion 243, and be retained by the positioning portion 243 when assembled.

Figure 2:
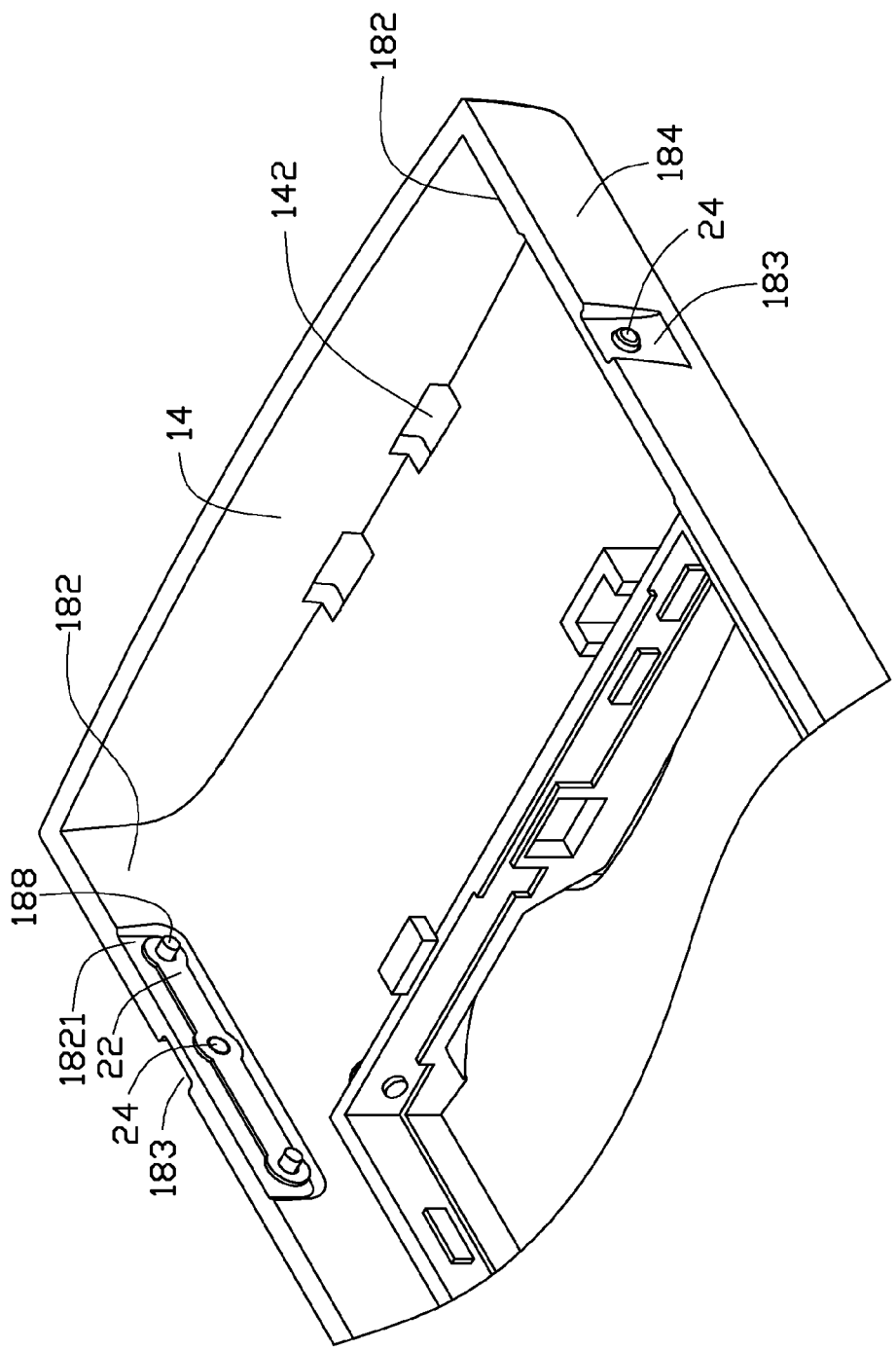
FIG. 2 is an enlarged view of a base assembled with two latching modules shown in FIG. 1.

Referring FIG. 2, during assembly of the portable electronic device 100, the positioning portions 243 of the latching elements 24 are respectively received in a corresponding positioning hole 223 and fixed to the positioning elements 22. In the first embodiment, the latching elements 24 are fixed to the positioning elements 22 by e.g., hot melting or welding to integrally form the latching modules 20. The positioning elements 22 are respectively received in a corresponding slot 1821. The resisting portion 241 passes through a corresponding through hole 186 and extends out of the groove 183. The posts 188 are respectively received in the latching holes 221 and fixed to the positioning elements 22 e.g., hot melting.

Figure 3:
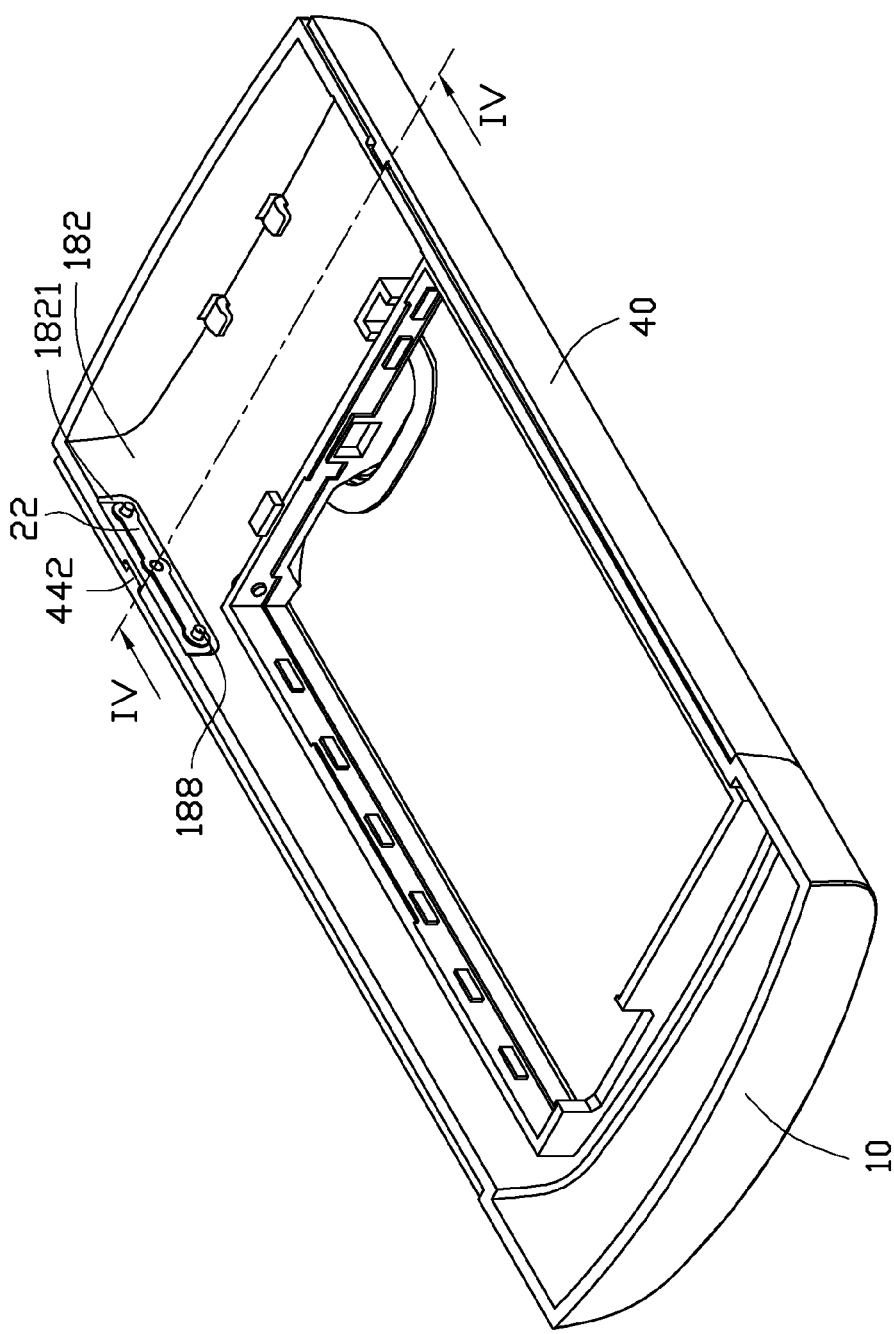
FIG. 3 is an assembled, isometric view of the portable electronic device shown in FIG. 1.
Figure 4:
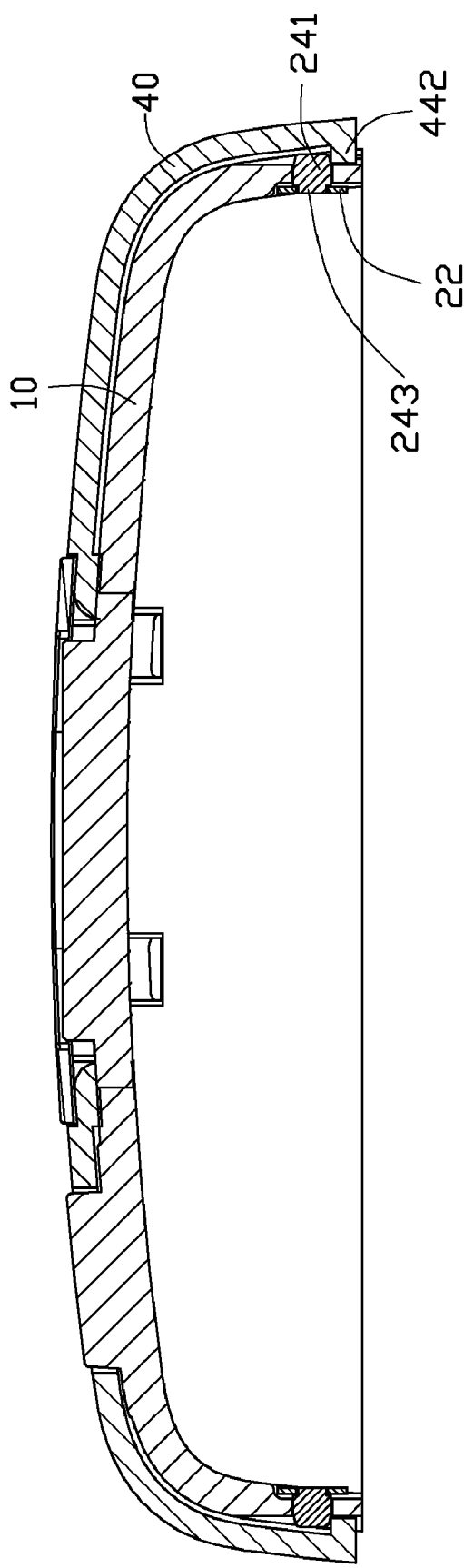
FIG. 4 is a cross section of the portable electronic device of FIG. 3.

The battery cover 40 is attached to the housing 10. The second tabs 421 are respectively the apertures 142 of one end portion 14. The battery cover 40 is pressed to rotate towards the housing 10. During the rotation of the battery cover 40, the resisting portions 241 press against the protrusions 442 of the battery cover 40 to impel the latching elements 24 to slide along the through holes 186 and deform the positioning elements 22. The battery cover 40 is further pressed such that the protrusions 442 latch with the resisting portions 241 by the elastic force of the positioning elements 22. And the first tabs 421 are respectively received in the apertures 142 of the other end portion 14. Thus, the portable electronic device 100 is assembled, as shown in FIGS. 3 and 4.

When a battery is to be changed or installed, the battery cover 40 is pulled such that the first tabs 42 are removed from the apertures 142 of housing 10. The battery cover 40 is moved away from the housing 10 such that the protrusions 442 resist and pass the resisting portions 241. Thus, the battery cover 40 can be removed from the housing 10.

The portable electronic device 100 has the latching module 20 that can elastically deform during assembly or disassembly of the battery cover 40, particularly when both of the housing 10 and the battery cover 40 are made of stiff material such as metal, the battery cover 40 can be stably attached to the housing 10 and easily operated.

Figure 5:
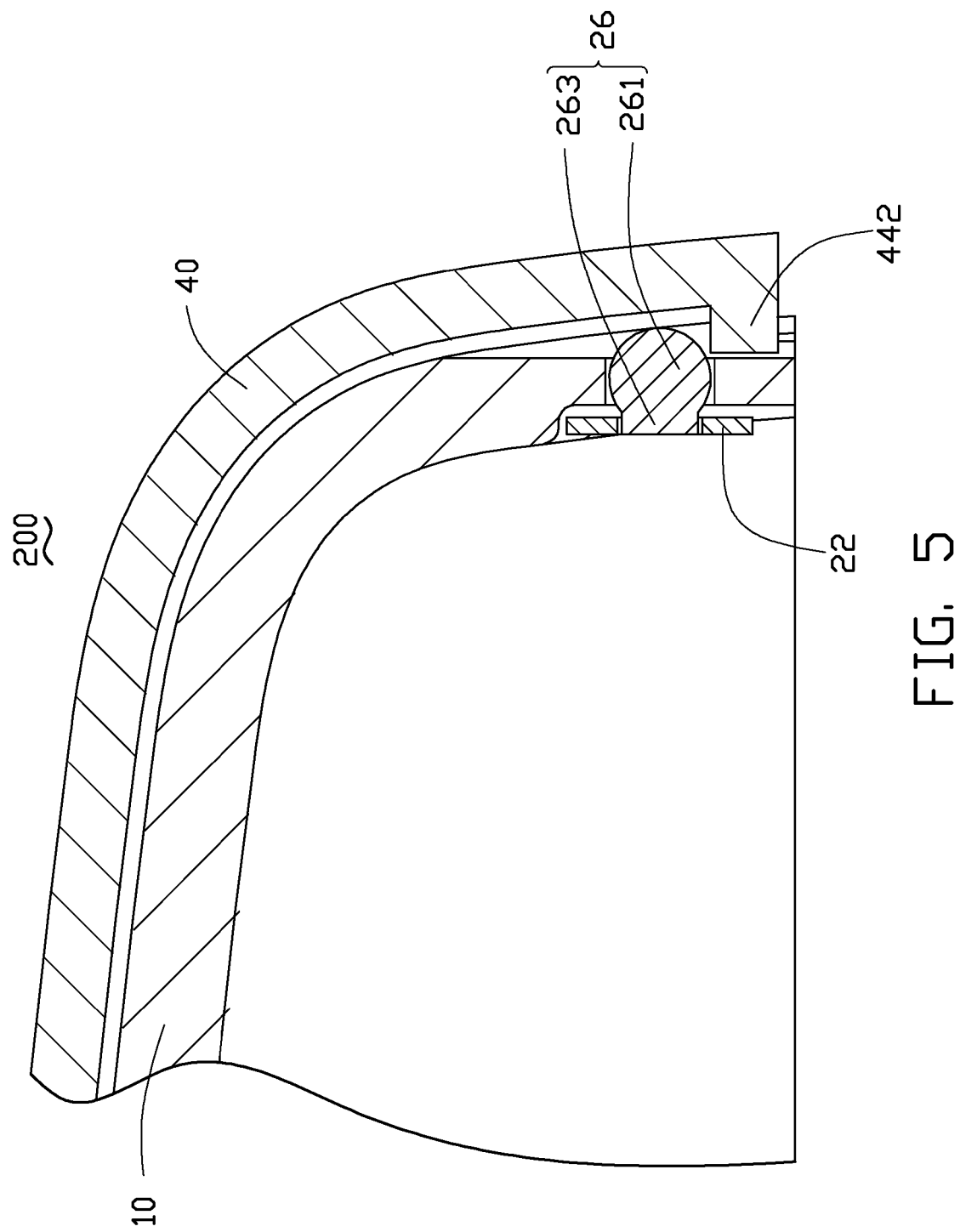
FIG. 5 is a cross section of the portable electronic device according to a second embodiment.

Referring to FIG. 5, in another embodiment, the latching module 201 includes a positioning element 22 and a latching element 26 fixed to the positioning element 22. The positioning element 22 is slidably attached to the housing 10. The latching element 26 includes a resisting portion 261 and a connecting portion 263. The resisting portion 263 is ball-shaped. The connecting portion 263 is fixed to the positioning element 22. The assembly method and usage of the portable electronic device 200 is substantially the same as that of the portable electronic device 100 described in the first embodiment.

It is to be understood that the tabs 42 at the two ends of the battery cover 40 can be varied. Furthermore, one end of the battery cover 40 can be rotatably attached to the housing 10. Moreover, there can be an additional elastic element e.g., a cushion or a sponge, between the positioning element 22 and the sidewall 18.

It is believed that the present embodiments and their advantages will be understood from the foregoing description, and it will be apparent that various changes may be made thereto without departing from the spirit and scope of the disclose or sacrificing all of its material advantages, the examples hereinbefore described merely being preferred or exemplary embodiments of the disclosure.

What is claimed is:

1. A portable electronic device comprising:
a housing, the housing having a sidewall defining a through hole;
a battery cover including at least one protrusion;
at least one latching module comprising an elastic positioning element attached to the housing and latching element attached to the elastic positioning element, the latching element comprising a resisting portion and extending through the through hole, the at least one protrusion of the battery cover causing the latching element to deform the elastic positioning element to release the battery cover from the housing; during attaching the battery cover to the portable electronic device, the latching element sliding along the through hole, and the resisting portion of the latching element passing through the through hole and latching with the at least one protrusion.

2. The portable electronic device as claimed in claim 1, wherein the housing and the battery cover are metallic.

3. The portable electronic device as claimed in claim 1, wherein the sidewall defines a slot communicating with the through hole, the elastic positioning element is received in the slot.

4. The portable electronic device as claimed in claim 1, wherein at least one post projects from the slot, the elastic positioning element defines at least one hole, in which the post is received.

5. The portable electronic device as claimed in claim 1, wherein the sidewall defines a groove communicating with the through hole, the latching element extends into the groove.

6. The portable electronic device as claimed in claim 1, wherein at least one first tab forms at one end of the battery cover and at least one second tab forms at the other end of the battery cover, the housing has two end portions each defining at least one aperture, the first and second tabs are respectively received in the apertures.

7. A portable electronic device comprising:
a housing, the housing having a sidewall defining a through hole;
a battery cover having a protrusion;
a positioning element slidably attached to the housing;
a latching element fixed to the positioning element, the latching element comprising a resisting portion and extending through the through hole; during attaching the battery cover to the portable electronic device, the latching element sliding along the through hole, and the resisting portion of the latching element passing through the through hole and elastically latching with the protrusion.

8. The portable electronic device as claimed in claim 7, wherein the housing and the battery cover are metallic.

9. The portable electronic device as claimed in claim 8, further comprising an elastic element, one end of the elastic element resisting the housing and the other end of the elastic element resisting the positioning element.

10. The portable electronic device as claimed in claim 9, wherein the sidewall defines a slot communicating with the through hole, the positioning element is received in the slot.

11. The portable electronic device as claimed in claim 9, wherein at least one post projects from the sidewall and extends into the slot, the positioning element defines at least one hole, in which the post is received.

12. The portable electronic device as claimed in claim 9, wherein the sidewall defines a groove communicating with the through hole, the latching element extends into the groove.

13. The portable electronic device as claimed in claim 7, wherein at least one first tab forms at one end of the battery cover and at least one second tab forms at the other end of the battery cover, the housing has two end portion each defining at least one aperture, the first and second tabs are respectively received in the apertures.

* * * * *